United States Patent
Kawada et al.

[11] Patent Number: 5,992,154
[45] Date of Patent: Nov. 30, 1999

[54] DRIER FOR DRYING INTERNAL COOLING GAS OF ELECTRIC MACHINE

[75] Inventors: Seiji Kawada; Yasuto Kondoh, both of Hitachi; Michio Sasaki, Juuou-machi; Hiroyuki Kido; Tetsuya Hashimoto, both of Hitachi, all of Japan

[73] Assignees: Hitachi Ltd.; Hitachi Engineering & Services Co., Ltd., both of Tokyo, Japan

[21] Appl. No.: 08/803,215

[22] Filed: Feb. 20, 1997

Related U.S. Application Data

[63] Continuation-in-part of application No. 08/544,925, Oct. 18, 1995, abandoned.

[51] Int. Cl.$^6$ ........................................... F25B 21/02
[52] U.S. Cl. .......................................... 62/3.4; 62/3.7
[58] Field of Search ........................... 62/3.2, 3.3, 3.4, 62/3.7, 96, 259.2

[56] References Cited

U.S. PATENT DOCUMENTS

| | | | |
|---|---|---|---|
| 3,367,120 | 2/1968 | Franklin | 62/3.2 |
| 3,973,938 | 8/1976 | Szabo et al. | 62/3.6 |
| 4,499,736 | 2/1985 | Lieu et al. | 62/3.4 |
| 4,586,342 | 5/1986 | Morishita et al. | 62/3.4 |
| 4,730,458 | 3/1988 | Alger | 62/3.4 |
| 4,989,626 | 2/1991 | Takagi et al. | 62/3.7 |

FOREIGN PATENT DOCUMENTS

| | | | |
|---|---|---|---|
| 1469620 | 2/1967 | France | 62/3.2 |
| 1 198 837 | 8/1965 | Germany | 62/3.7 |
| 7-123647 | 5/1993 | Japan . | |
| 932865 | 6/1983 | U.S.S.R. | 62/3.2 |

*Primary Examiner*—William Doerrler
*Attorney, Agent, or Firm*—Antonelli, Terry, Stout & Kraus, LLP

[57] ABSTRACT

A drier has a cooler block for drying internal cooling gas circulated in an electric machine, and the temperature of the cooler block is controlled by a thermoelectric device having Peltier effect and keep a constant temperature being near freezing point and not below the freezing point of dew drop contained in the gas.

3 Claims, 4 Drawing Sheets

DRIER FOR DRYING INTERNAL COOLING GAS OF ELECTRIC MACHINE

This application is a Continuation-in-Part of application Ser. No. 08/544,925, filed Oct. 18, 1995 now abandoned.

BACKGROUND OF THE INVENTION

The present invention relates to a drier for a cooling gas circulated in a rotating electric machine, and especially relates to a drier for drying cooling gas fed out from an electric rotating machine through a pipe line, dehumidifying the cooling gas so as to dry it by cooling it outside of the rotating electric machine, and returning the dried cooling gas to the rotating electric machine through another pipe line.

In a conventional drier using an external cooling type gas drying method, the dew point of the cooling gas provided in the rotating electric machine is kept below a surface temperature of an internal gas cooler installed in the rotating electric machine.

In an external cooling type gas drying equipment for a rotating electric machine, as described in Japanese Patent Laid-Open Application 2-85676 (1995), a gas refrigerator for circulating the coolant and in which a shell-tube cooler is separated from a refrigerating unit is generally provided.

In the conventional system described above, in order to keep the dew point of the cooling gas provided in the rotating electric machine under a surface temperature of an internal gas cooler installed in the rotating electric machine, the condenser in the external cooling type gas drying equipment is cooled below the needed temperature. In this manner, dew drops in the shell-tube cooler are frozen and the circulation of the cooling gas for the electric rotating machine is obstructed so that dehumidifying and drying of the cooling gas are reduced. Therefore, the temperature of the coolant is controlled so as not to be below the freezing point of the coolant.

However, in a gas-refrigerator in which the shell-tube cooler is separated from the refrigerating unit, the response of temperature control to the fluctuation of the load is not very good, and the setting range of the temperature control becomes wide. Therefore, the temperature of the shell-tube cooler is set near 10° C., and there arises a problem in that it becomes impossible to make the dew point of the cooling gas in the rotating electric machine fully low.

SUMMARY OF THE INVENTION

The object of the present invention is to stably control the temperature of the cooler block near the freezing point without freezing the dew drops in the shell-tube cooler of the outer cooling type gas drier, in spite of load fluctuation such as temperature changing in the rotating electric machine, and to decrease the dew point of the cooling gas in the rotating electric machine.

In order to attain the above object, in the present invention, the temperature of the cooler block in the outer cooling type gas drier is precisely controlled to keep a lowest temperature which is not the freezing point or below by using an thermoelectric device for controlling the temperature of the cooling block of the outer cooling type gas drier based on Peltier effect of the thermoelectric device.

The temperature of the cooler block of the drier is measured with a thermometer and the electric current of the thermoelectric device is controlled according to a signal from the thermometer. The thermoelectric device is installed on the cooler block directly or through a heat-transfer plate, whereby the temperature of the cooler block is precisely controlled to keep it at the lowest temperature in spite of the load fluctuation, and the dew point of the internal cooling gas in the rotating electric machine is kept at the lowest point without freezing the dew drop in spite of a temperature of the cooler block being set at a temperature near the freezing point.

DETAILED DESCRIPTION OF THE PREFERRED EMBODIMENTS

Figure 1:
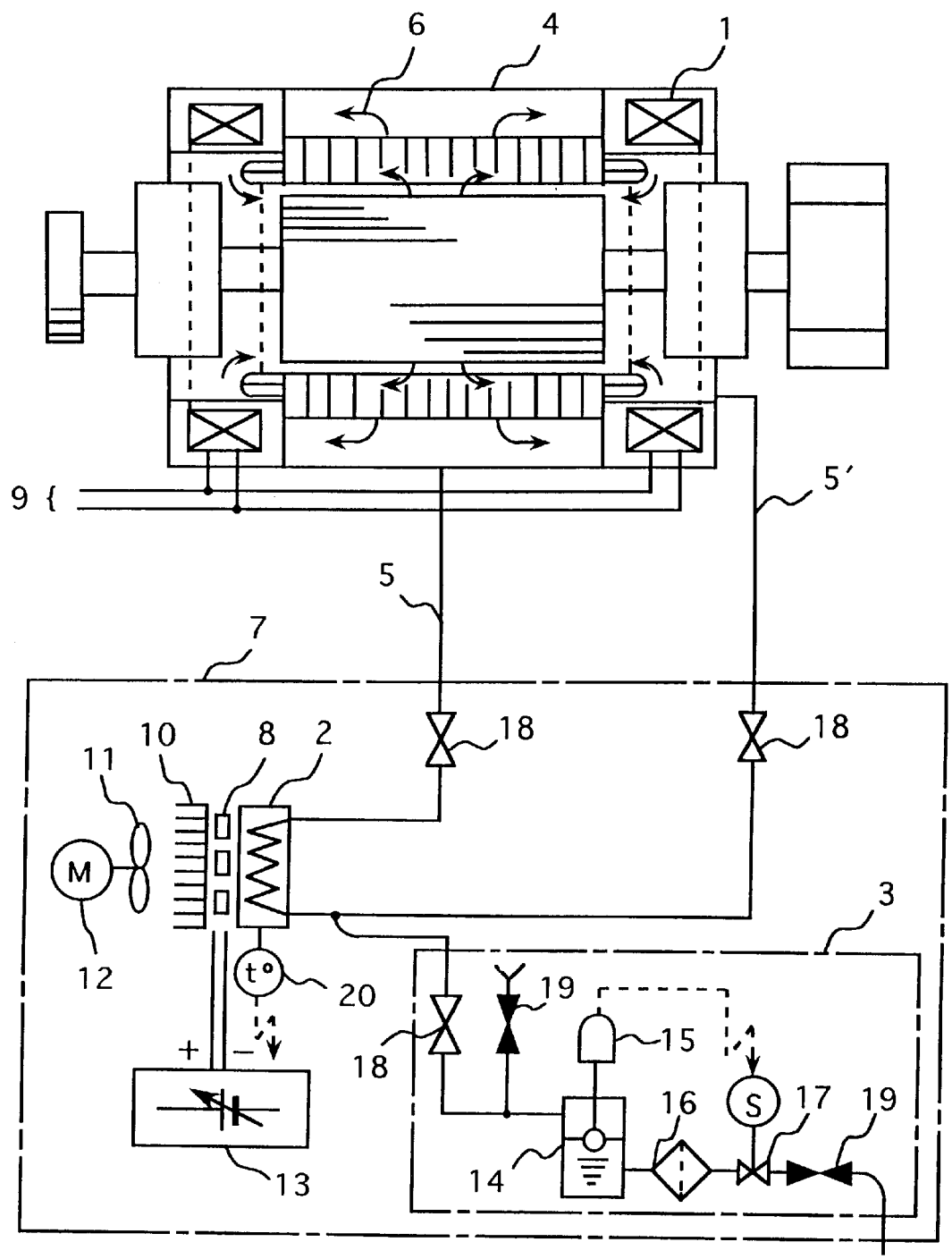
FIG. 1 is a diagram for showing a total construction of a drier for drying a internal cooling gas of a electric machine in accordance with the present invention.
Figure 2:
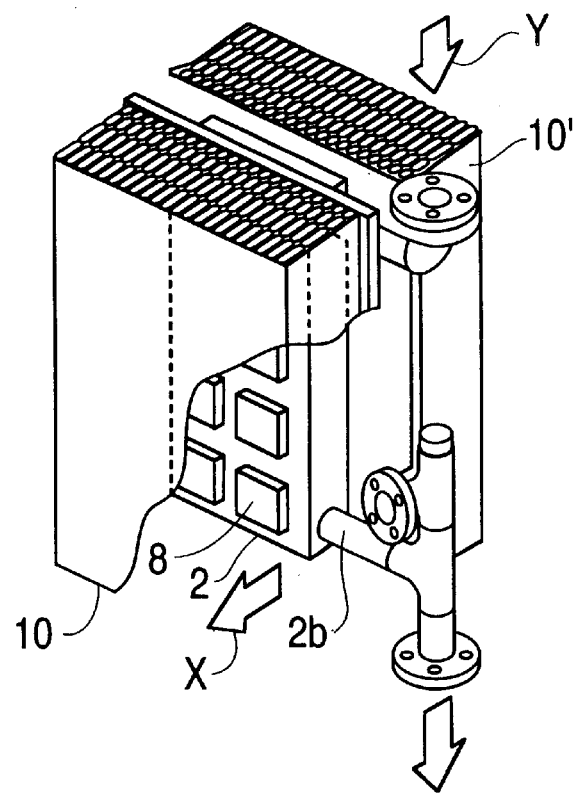
FIG. 2 shows a perspective view of a construction around a cooler block 2 shown in FIG. 1.
Figure 3:
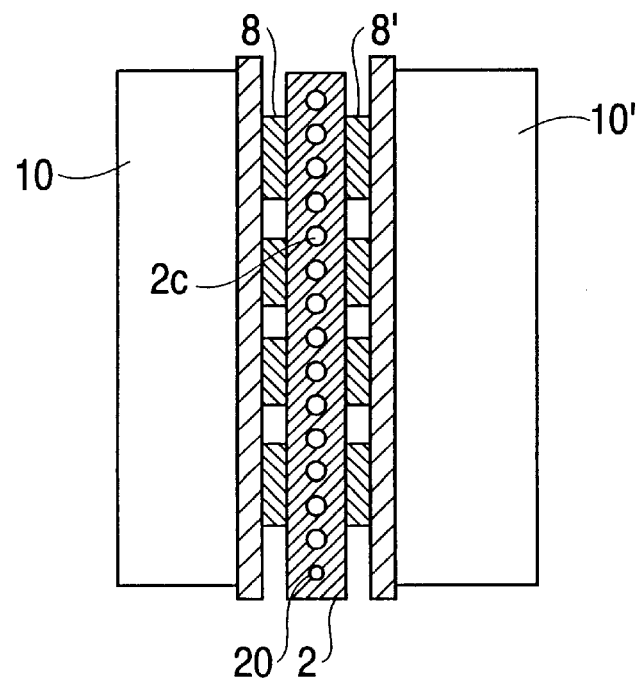
FIG. 3 shows a cross-sectional view of the cooler block on a plane defined by a direction X and a direction Y as shown in FIG. 2.

FIG. 1 shows an embodiment of a device for controlling a temperature of a cooler block in a drier using an thermoelectric device having Peltier effect in the present invention.

In FIG. 1, numeral 1 denotes an internal gas cooler, 2 a cooler block, 3 a drainage unit, 4 a rotating electric machine, 5, 5' pipe lines, 6 an internal cooling gas, 7 an external cooling type gas drier, 8 a thermoelectric device, 9 a cooling water pipe line, 10 a cooling fin, 11 a fan, 12 a motor, 13 a variable D.C. Power supply, 14 a tank for dew drop, 15 a level sensor, 16 a filter, 17 a solenoid operated valve, 18, a normal open valve, and 19 a normal closed valve.

Cooling gas 6 circulates in a rotating electric machine 4, and is cooled by an internal gas cooler 1 connected to a cooling water pipe line 9 in this embodiment.

In order to prevent the amount of water component contained cooling gas 6 from increasing while the cooling gas is circulated, the cooling gas 6 is fed out to an external cooling type gas drier 7 installed on the rotating electric machine through a pipe line 5, the cooling gas 6 is dehumidified and dried in the drier 7 and then returned to the rotating electric machine 4 so as to be continuously circulated between the rotating electric machine 4 and the external cooling type gas drier 7.

A cooler block 2 in the drier 7 is cooled by the heat pump effect of a thermoelectric device 8 installed directly or through a heat-transfer plate on the drier 7. The heat absorbed or generated with the heat pump effect of the thermoelectric device 8 is cooled by a fan 11 driven by a motor 12 and is lost out of the drier 7.

The temperature t of the cooler block 2 is measured by a thermometer 20 and a signal therefrom is used to control a variable D.C. Power supply 13 for actuating the thermoelectric device 8.

Further, a drainage unit 3 is composed with a tank 14, a level sensor 15, a filter 16, a solenoid operated valve 17, a normal open valve 18 and a normal closed valve.

In the embodiment shown in FIG. 1, the temperature of the cooling block is precisely controlled so as to keep a constant lowest temperature in spite of a load fluctuation such as a temperature changing of a coolant passing through the cooler block 2.

A detailed construction around the cooler block 2 in FIG. 1 is shown in FIGS. 2 to 5. The cooler block 2 is formed by a flat rectangular solid, and electronic cooling elements 8 are mounted on the both sides thereof.

Figure 4:
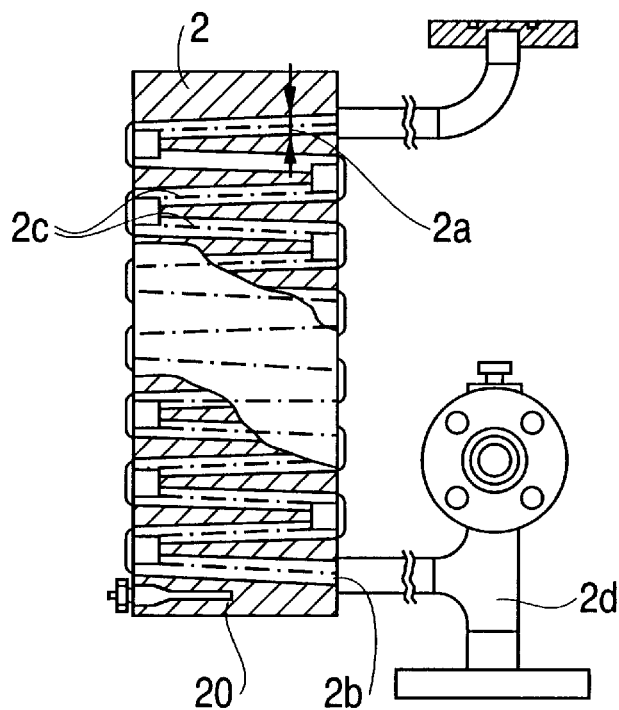
FIG. 4 shows a cross-sectional view of the cooler block 2 shown in FIG. 2.
Figure 5:
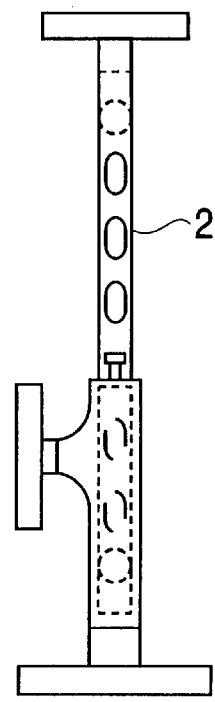
FIG. 5 shows a right-hand side view of the cooler block shown in FIG. 4.

On the other surface of the elements 8, cooling fin 10 is mounted. A gas inflow port 2a is provided in an upper part of the cooler block 2, and an effluence port 2b is provided in a lower part of the cooler block 2, as shown in FIG. 4. The inflow port 2a and the effluence port 2b are connected through with a meandering passage 2c formed in a block. Furthermore, a temperature sensor 20 is installed at a position closed to the passage 2c of a lower end of the cooler block 2.

Figure 6:
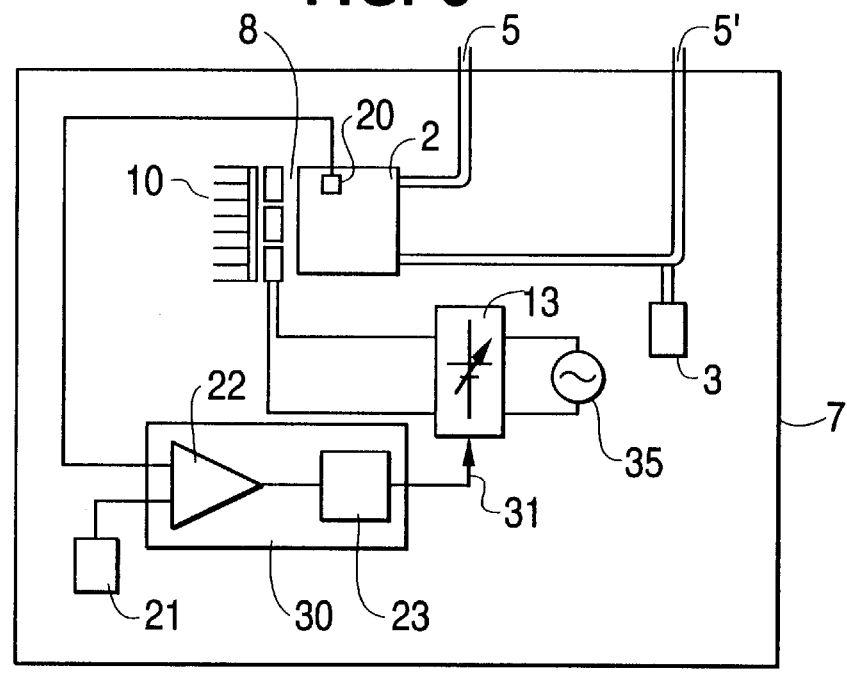
FIG. 6 shows a schematic diagram of an external cooling type gas drier 7 shown in FIG. 1.

FIG. 6 shows a control circuit of electronic cooling elements 8, 8'. The electronic cooling elements 8, 8' are driven by a variable type direct current power supply 13 connected to a commercial power supply 35. An electric current output from the variable type direct current power supply 13 varies according to a reference signal 31 from a controller 30. The controller 30 consists of a comparator 22 and an amplifier 23, a signal from a temperature sensor 20 and a signal from a setting device 21 are input into the comparator 22, thereby a deviation of both signals is obtained by the comparator 22, and it is amplified with the amplifier 23 to be output as an output signal.

The setting device 21 sets a temperature at an effluence side of the cooler block 2; usually, a temperature is set at which moisture contained in the gas passed by said effluence side does not freeze and a condensation efficiency of the moisture becomes the best. As a setting temperature, 2 centigrade is the most suitable, however, in a practical use, a temperature of 2 to 7 centigrade is may be set. In FIG. 1, when usually driving the control system, both of the valves 18 provided in the pipes 5, 5' are opened, and the gas passes through the external cooling type gas drier 7 from the pipe 5 to the pipe 5' by a blower installed in the internal gas cooler 1. The gas flowed into the cooler block 2 from the inflow port 2a is gradually cooled in a process to flow through passage 2c, and temperature of the gas deteriorates by degrees and vapor contained in the gas condenses to be separated as water. The water which condenses on a side wall of the passage 2c moves to the effluence port 2b side with the gas, and it is guided from a divergence pipe 2d to the drainage unit 3 for the condensed water.

Figure 7:
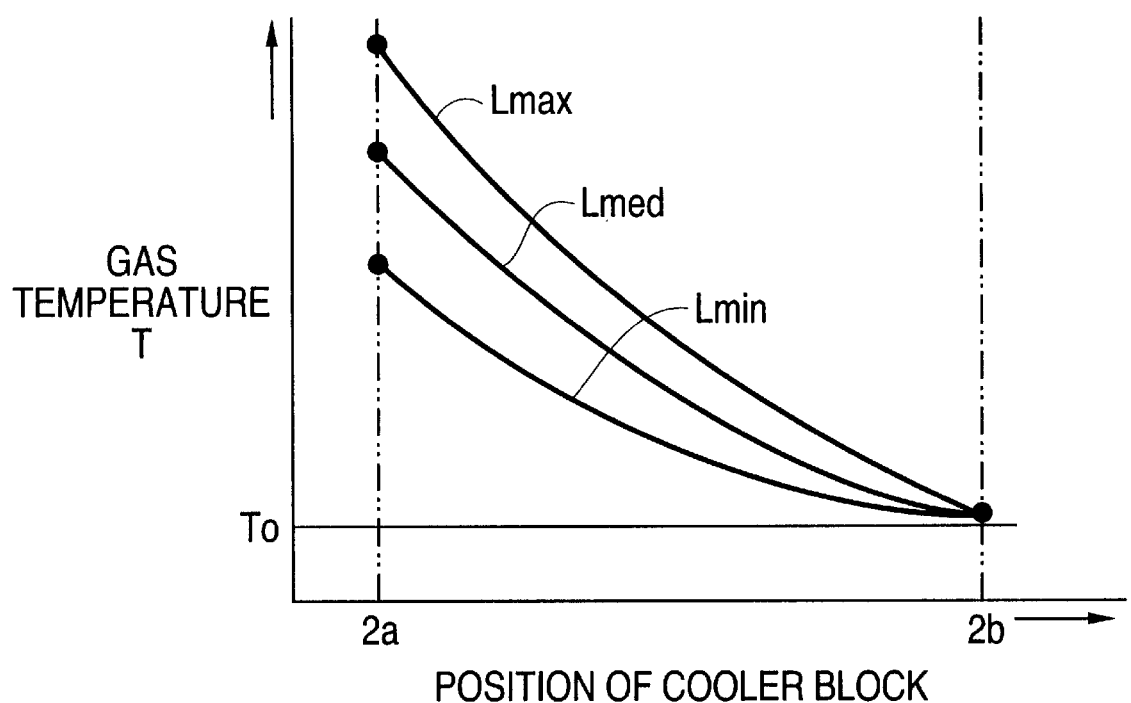
FIG. 7 shows the temperature change of the gas flowing through the passage 2c of the cooler block 2 in the present invention.

As shown in FIG. 7, the temperature of the gas flowing through the passage 2c of the cooler block 2 becomes the highest at the inflow port 2a successively, and becomes the lowest at the effluence port 2b. Since, the vapor contained in the gas freezes when the temperature of the effluence port of the cooler block 2 having the lowest temperature becomes less than a freezing point, there can arise a problem that the passage for gas closes. Therefore, the temperature of the cooler block 2 close to the effluence port 2b is detected with a sensor 20, and a feedback control is performed so that the temperature of the cooler block 2 close to the effluence port 2b corresponds to the setting value. That is, the output signal from the sensor 20 is compared with the setting value, and when any deviation is generated, an electric current for driving the electronic cooling element 8 is adjusted to make the deviation zero.

When a load of the rotating electric machine 4 changes, the temperature of the coolant gas changes as shown by curves Lmax, Lmed and Lmin changing according to the loads respectively being maximum, medium and minimum. When the load is the maximum, the gas temperature is the highest as shown in the curve Lmax, and when the load is the minimum, the temperature becomes the lowest as shown in the curve Lmin.

Even if the temperature of the gas guided from the external cooling type gas drier 7 changes as shown in FIG. 7, it is desirable for the temperature of the gas flowing at the effluence port to be constant, and to be close to and a little higher than the freezing point temperature To.

Here, the temperature of the gas flowing at the effluence port 2b is detected by the sensor 20 mounted on a position of the cooler block 2 close to the effluence port 2b, and in a practical use, the sensor 20 is disposed around a lowest turn of the meandering passage 2c so as to detect the temperature of the gas passing through effluence port 2b.

In the present invention, when the driving condition of the rotational electric machine changes, whereby the gas temperature at the effluence port changes, the driving electric current applied to the electronic cooling element 8 is changed so as to cancel the change of the gas temperature at the effluence port; that is, the cooling ability of the electronic cooling element 8 changes so as to maintain the gas temperature of the effluence port to be the setting value.

When a signal output from the sensor 20 is taken in the controller 30, a signal to change a driving current of the element 8 is output instantly; furthermore, the cooling ability of the element 8 may be changed within a short time, the time-lag of first order in the feed-back control circuit is extremely small and it becomes possible to make the gas temperature correspond to the setting value with good precision.

Accordingly, in spite of the load change of the rotational electric machine, the gas temperature is controlled to be very close to the freezing point temperature To without being frozen; therefore, freezing of the gas is prevented without sacrificing a high dehumidification effect.

We claim:

1. An external cooling type gas drier to lead cooling gas out of an electric machine cooled by the drier and to dehumidify the cooling gas, comprising:

a thermoelectric device which transports heat using Peltier effect;

a cooler block cooled by said thermoelectric device and having a passage formed therein for circulating the cooling gas;

a temperature sensor for detecting a temperature in a vicinity of an effluence port for the cooling gas on the cooler block; and a controller for controlling an electric current supplied to the thermoelectric device so as to control the heat transported by the thermoelectric device according to an output from the temperature sensor, wherein said temperature in a vicinity of the effluence port is controlled so as to maintain a temperature which is higher than the freezing point of dew drops in the cooling gas.

2. An external cooling type gas drier as defined in claim 3, wherein said passage for circulating the cooling gas formed in said cooler block is a meandering passage for the cooling gas from one end to other end of said cooler blocker, and said sensor is mounted on said cooler block in a vicinity of said effluence port.

3. An external cooling type gas drier as defined in claim 1, wherein said temperature which is a little higher than the freezing point is from 2 to 7 centigrade.

* * * * *